(12) United States Patent
Leffler et al.

(10) Patent No.: US 6,923,901 B2
(45) Date of Patent: Aug. 2, 2005

(54) NON-CHEMICAL WATER TREATMENT METHOD AND APPARATUS EMPLOYING IONIZED AIR PURIFICATION TECHNOLOGIES FOR MARINE APPLICATION

(75) Inventors: Charles E. Leffler, Lighthouse Point, FL (US); Dennis E. J. Johnson, Colorado Springs, CO (US)

(73) Assignee: Marine Environmental Partners, Inc., West Palm Beach, FL (US)

( * ) Notice: Subject to any disclaimer, the term of this patent is extended or adjusted under 35 U.S.C. 154(b) by 319 days.

(21) Appl. No.: 10/106,810

(22) Filed: Mar. 26, 2002

(65) Prior Publication Data

US 2002/0170816 A1 Nov. 21, 2002

Related U.S. Application Data

(60) Provisional application No. 60/278,477, filed on Mar. 26, 2001.

(51) Int. Cl.[7] ............................................... C02F 1/461
(52) U.S. Cl. .................... 205/701; 205/752; 205/756; 205/757; 204/157.15; 204/267; 204/269; 204/270; 210/748; 210/758; 210/764
(58) Field of Search ................. 205/701, 752, 205/756, 757; 204/157.15, 267, 269, 270; 210/748, 758, 764

(56) References Cited

U.S. PATENT DOCUMENTS

| | | | |
|---|---|---|---|
| 3,959,131 A * | 5/1976 | Ramirez et al. ............ 210/707 |
| 4,248,681 A | 2/1981 | Sweeney | |
| 4,248,715 A | 2/1981 | Olivier | |
| 4,256,552 A | 3/1981 | Sweeney | |
| 4,358,058 A | 11/1982 | Bierman | |
| 4,361,471 A | 11/1982 | Kosarek | |
| 4,525,243 A | 6/1985 | Miller | |
| 4,563,286 A | 1/1986 | Johnson et al. | |
| 5,443,719 A | 8/1995 | Johnson et al. | |
| 5,549,800 A | 8/1996 | Iwata | |
| 5,597,479 A | 1/1997 | Johnson et al. | |
| 5,616,250 A | 4/1997 | Johnson et al. | |
| 5,622,622 A * | 4/1997 | Johnson ..................... 210/192 |
| 5,635,059 A | 6/1997 | Johnson et al. | |
| 5,674,312 A * | 10/1997 | Mazzei ....................... 95/261 |
| 5,685,994 A | 11/1997 | Johnson | |
| 5,728,303 A | 3/1998 | Johnson | |
| 5,792,369 A | 8/1998 | Johnson | |
| 5,840,159 A | 11/1998 | Rosenblad | |
| 6,277,288 B1 * | 8/2001 | Gargas ....................... 210/748 |
| 6,517,713 B2 * | 2/2003 | Gargas ....................... 210/192 |
| 6,551,518 B2 * | 4/2003 | Gargas ....................... 210/748 |
| 6,740,245 B2 * | 5/2004 | Johnson ..................... 210/748 |
| 2004/0099607 A1 * | 5/2004 | Leffler et al. .............. 210/704 |
| 2004/0099608 A1 * | 5/2004 | Leffler et al. .............. 210/704 |

* cited by examiner

Primary Examiner—Arun S. Phasge
(74) Attorney, Agent, or Firm—J. Rodman Steele, Jr.; Michael K. Dixon; Akerman Senterfitt

(57) ABSTRACT

Contaminated water, particularly, ballast water, blackwater, galley water, accommodation water, laundry water, fresh water and seawater, is disinfected by admixture of a highly reactive gas stream containing ions of oxygen and nitrogen, formed by exposure of air to short-wavelength ultraviolet radiation, and of chlorine, formed in situ by electrolysis of salt in the water. Solids removal can be accomplished by electrophoresis in the same unit employed for electrolysis to release chlorine, or in a separate unit. Heavy metals maybe removed by plating or sacrificing electrodes.

34 Claims, 13 Drawing Sheets

Atmospheric oxygen is ionized, forming singlet oxygen:

Atmospheric nitrogen ionization and dissociation:

Dissociation

Ozone formation and dissociation:

Singlet oxygen may react with water vapor to form hydrogen peroxide and hydroxide radicals:

Ionized oxygen and nitrogen react to form various combinations:

Ionized oxygen and nitrogen react to form various combinations:

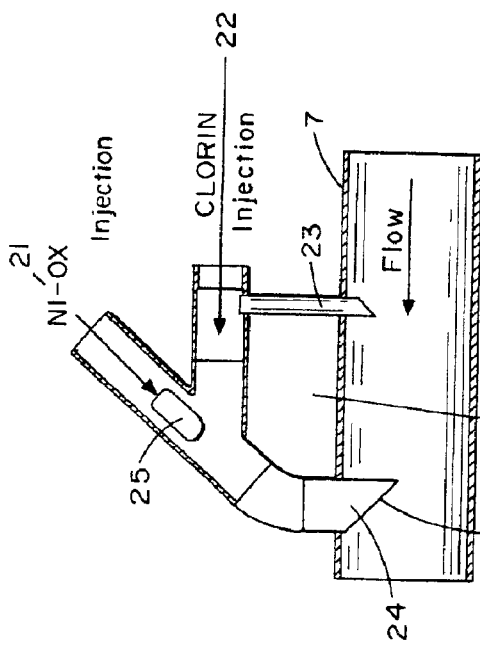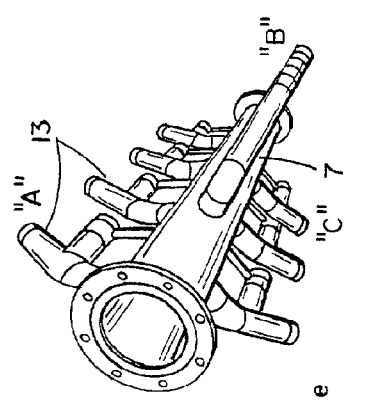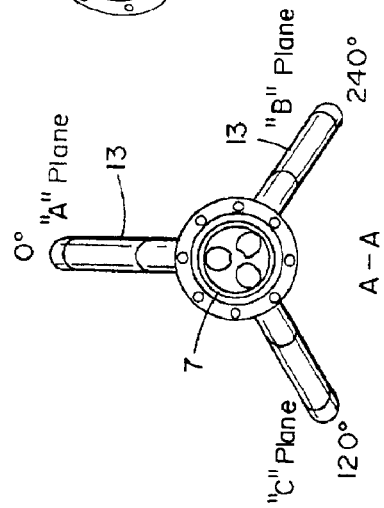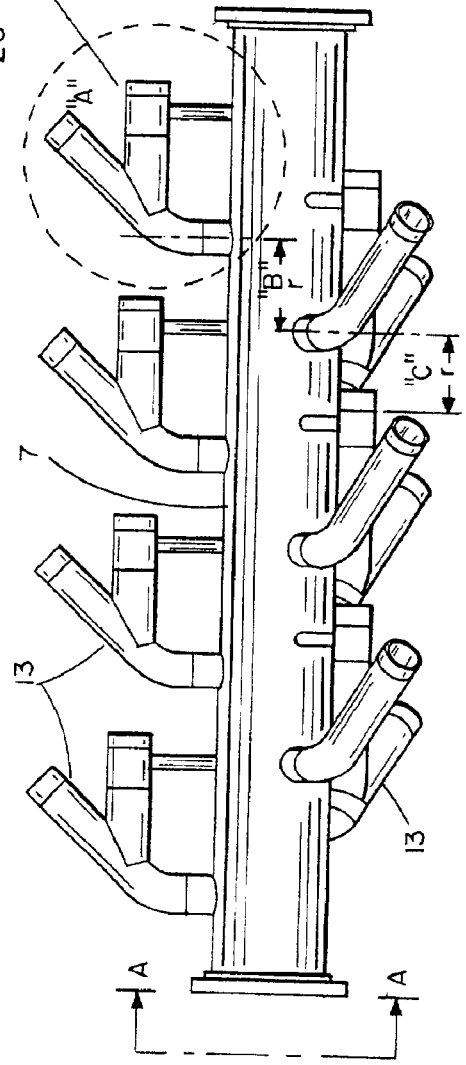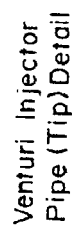

NON-CHEMICAL WATER TREATMENT METHOD AND APPARATUS EMPLOYING IONIZED AIR PURIFICATION TECHNOLOGIES FOR MARINE APPLICATION

CROSS-REFERENCE TO RELATED APPLICATION

This application claims priority from Provisional Application Ser. No. 60/278,477, filed Mar. 26, 2001, which is incorporated by reference herein.

FIELD OF THE INVENTION

This invention relates to a system and methods for the efficient generation of ionized gas (vapor) atoms and molecules for water and/or wastewater disinfection, and more generally, to methods and apparatus for non-chemical methods of water treatment, that is, avoiding use of conventional chemical reagents and processes, such as treatments involving one or more of polymers, coagulants, sterilizers, and disinfectants. The invention provides non-chemical methods of water disinfection, coagulation, solids removal, decontamination, and highly efficient and economical purification. The invention is particularly applicable to treatment of marine water. Marine water is defined as water generated aboard ships and boats as well as those generated in nearby ports, harbors, marinas, offshore platforms and shipyards. On board the ship this includes, ballast water, galley water, black water, greywater, laundry water and waste water. In other maritime applications; for example, ballast water can be treated according to the invention to disinfect it, in order to prevent the spreading of indigenous species, both on intake and prior to discharge. It can also be used to remove biota and impurities from ground water run-off in ports and harbors. Further it can treat human waste for discharge on off-shore platforms.

APPLICATION OF AND BENEFITS PROVIDED BY THE INVENTION

In recent years, the problems caused by spreading of indigenous species by intake into ship ballast water in one part of the world, followed by their discharge elsewhere and the spreading of these species in new ecosystems, has received increased media attention and governmental scrutiny. The introduction of the zebra mussel into the Great Lakes of the United States is a well-publicized example of this problem, but is only one of many. Similar problems exist elsewhere in the maritime and related industries. Other mussels, jelly fish and even carnivorous fish have recently been found in U.S. harbors and these are attributed to ballast water discharge.

More particularly, ships are designed to ride best when ballasted to a predetermined degree. As the ship's weight changes, through discharge of cargo or consumption of fuel, it is common practice to add ballast by intake of seawater. When the ship arrives at another port for loading or refueling, the ballast water taken on is discharged. In many cases, species ranging from micro-organisms such as bacteria and viruses through larger animals such as fish, snails, the above-mentioned zebra mussels, and others, are thus spread forcibly beyond their natural range. In some cases they are thus introduced into new ecosystems, frequently with disastrous results. Accordingly, a need exists to disinfect such ballast water upon either or both of intake and discharge. Governmental regulation of the cruise-ship industry in particular to address this problem is believed to be imminent. Similarly, it is necessary to treat water elsewhere in the marine environment, e.g., ship laundry water, galley water, black water relying on water for washing, cooling, and the like. The invention has applicability in numerous such circumstances. This system can also be utilized to remove heavy metals and biota from shipyard run-off water.

BACKGROUND OF THE INVENTION

Treating ballast water is a new legal requirement and there have not been any proven technologies that can remove all of the life forms in sea water. Waste water in ships up until now have been simply disposed of at sea. Some forms of chlorination and maceration have been in use but the requirement to process waters is just now becoming an international effort. The methods of water disinfection most frequently used has been chlorination or over chlorination creating many damaging chlorine compounds that harm the environment. the art of water treatment in general, is most often represented by various hydro-separators, mechanical filters, and/or chemically oriented apparatus, bioreactors, ultra-violet light and membrane technologies. (including chemical post-treatment) whereby impurities are removed from water. The basic types of known water treatment purification arrangements and their accompanying problems and limitations may be categorized generally as follows:

1. Non-regeneratable modular filters are one time use, short-term devices of inexpensive cartridge design that have restrictive low-flow and high head-loss pressure limitations. Typical filter materials are packed cellulose or fibrous/filament textiles that, at best, provide (at optimal flow) no better than a continuous 5–10 micron absolute particle size separation. Minor recognizable suspended solids in the water influent flow will quickly clog the filter media material within the cartridge and render the filter system involved inoperable. Where moderate and high flow rates are involved, replacement costs and down time are inordinately costly and burdensome. Further, these filters and separation units are usually non-compatible and fairly short-lived if an attempt is made to combine them with oxidizing and corrosive chemical treatment agents within the contaminated water to be purified.

2. Chemical treatment methods typically include use of one or more of oxidizers, polymers, flocculants, and coagulants, and may also include use of chlorine for disinfection and sterilization. These methods are cost prohibitive and labor-intensive and can require high maintenance, as if misused they can damage the associated waste treatment equipment component(s) system. Further, various chemical treatments involve health and safety risks leading to restrictions on their use and reduction of permitted exposure. Commonly, chemical process treatment methods lead to the generation of voluminous amounts of toxic chemical solids and sludges along with the associated environmental exposure problems; further, these methods may involve liability issues and regulatory agency controls due to the necessity of disposal of these hazardous substances.

3. Ozone generators, e.g., as conventionally offered as "Corona-Arc Generation" disinfection and treatment systems provide a high voltage electric arc or corona. These open spark discharges are potentially dangerous. Moreover, these systems require fairly high power and have relatively high maintenance requirements, and are expensive to operate in that they require a supply of low-humidity air (leading to continuous desiccators and dryer maintenance requirements) and further require high maintenance air-separation oxygen concentrator equipment. Problems due to potentially toxic exposure to ozone can also exist.

4. Reverse osmosis (R.O.) treatment systems, involving membrane separation of sub-micron particles from water, often present problems associated with shortened membrane life due to plugging, limited process flow capacity, and the necessity of disinfection of the membrane(s) so as to be free from contaminating biological agents and/or oily materials. R.O. membranes are also highly susceptible to fouling with biological growth; further, R.O. treatment systems are costly both as to initial cost and in operation, as they require substantial electrical power to provide the high pressure needed for operation, and due to their high maintenance requirements.

5. Traditional filtration systems employ one or more of carbon, anthracite, clay, coal, paper, fibrous materials, "mixed media", and/or sand as a physical removal method, that is, to establish a solids separation and filtration process. These systems often involve operational problems such as early fouling of the filtration media, which often requires very frequent filter back-washing and adds difficulties inherent in the disposal of large quantities of the backwashed materials. The back-wash water may be very biologically active and also require disinfection, due to "bleed through" bacterial recontamination of the water being treated. Quite often, in order to maintain a steadystate level of solids removal and continuous purification efficiencies, the entire volume of filtration materials must be removed and replaced several times per year due to encrustment and contamination.

6. Ion exchange filters basically remove only dissolved ions and electrically charged colloidal solids; they rapidly plug in the presence of suspended solids. Even a moderate flow (50–100 GPM) ion exchange filter system represents a complex plumbing network involving unwieldy resin filter and/or "zeolite staged" containers and requires large regenerative acid and base tankage. Regeneration of the filter resin is complicated and is often incomplete due to the plugging of the resin pore spaces by the larger particle size suspended solids that gain entry into the flow. These systems have substantial flow rate restrictions limiting their practicality for larger commercial or general-purpose use. Thus, ion exchange filtration is suitable only for very select water treatment or specific wastewaters and also often involves high capital equipment purchase cost in addition to high repetitive media replacement and operational costs.

7. Ultra violet light has been utilized but it can only remove virus and bacteria and not the more complex light forms. This method also requires very clear water or there will be no disinfection.

INVENTOR'S PRIOR ART

As explained in further detail below, the present invention encompasses multiple technological advancements, refinements, and/or alterations of the basic principles of applied water treatment as represented in one or more of the following U.S. patents, as to each of which one of the present inventors is sole or joint inventor, and which are incorporated by reference herein.

Title. SYSTEM AND REACTOR FOR MIXING COAGULATING AGENTS INTO CONTAMINATED WATER FLOW, AND FOR REMOVING CONTAMINANTS THEREFROM U.S. Pat. No. 5,443,719 Issued: Aug. 22, 1995

Title: METHOD AND APPARATUS FOR WATER TREATMENT AND PURIFICATION USING GAS ION PLASMA SOURCE AND DISINFECTANT METAL ION COMPLEXES U.S. Pat. No. 5,635,059 Issued: Jun. 3, 1997

Title: ELECTRO-COALESCENCE/MAGNETIC SEPARATION (ECMS) SYSTEM AND COMPONENTS FOR REMOVAL OF CONTAMINANTS FROM WATER STREAMS, INCLUDING DESALINIZATION.

U.S. Pat. No. 5,597,479 Issued: Jan. 28, 1997

Title: METHOD, SYSTEM, AND REACTOR FOR MIXING COAGULATING AGENTS INTO A CONTAMINATED WATER FLOW, AND FOR REMOVING CONTAMINANTS THEREFROM U.S. Pat. No. 5,616,250 Issued: Apr. 1, 1997

Title: IMPROVED ULTRAVIOLET STERILIZER AND SOURCE OF IONIZED MOLECULES FOR ECMS REMOVAL OF CONTAMINANTS FROM WATER STREAMS U.S. Pat. No. 5,622,622 Issued: Apr. 22, 1997

Title: METHOD AND APPARATUS FOR WATER TREATMENT AND PURIFICATION USING GAS ION PLASMA SOURCE AND DISINFECTANT METAL ION COMPLEXES.

U.S. Pat. No. 5,685,994 Issued: Nov. 11, 1997

Title: APPARATUS AND PROCESSES FOR NONCHEMICAL PLASMA ION DISINFECTION OF WATER

U.S. Pat. No. 5,792,369 Issued: Aug. 11, 1998

OBJECTS OF THE INVENTION

The principal object of the invention is to provide extremely efficient, low maintenance, low energy cost modular water purification and contamination control technology for the non-chemical disinfection and contaminant separation of various types of water or wastewater streams as encountered in the marine industry. The water treatment and purification areas of particular interest include, but are not limited to, ship ballast water and marine discharge wastewaters.

Specifically, the non-chemical water purification and disinfection technology of the invention exhibits higher treatment efficiency than more conventional water treatment methods that rely on chemicals, traditional filtration, reverse osmosis, ozone generators, etc, and also involves reduced energy costs. By eliminating the treatment chemicals, increasing sub-micron particle size solids separation and removal, and by very efficient destruction of bacteria and biological agents within the treated water through electrically-driven disinfection, a number of operational, maintenance and serious health and water treatment problems can be eliminated, resulting in the economic disinfection of ballast water and the like and thus avoiding spread of nonindigenous species.

Accordingly, it is the ultimate object of the current invention to establish non-chemical water treatment disinfection and purification technologies that represent realistic, "user friendly", and cost effective answers to global water issues and concerns, particularly in the marine and maritime-related industries. The system will have a relatively small footprint and can operate under varying loads and chemistry.

SUMMARY OF THE INVENTION

As in the prior patents incorporated by reference above, the system of the invention mixes an atmospheric air stream including a large portion of ionized, highly reactive oxygen and nitrogen vapor into a contaminated water stream to be treated, so that the ionized oxygen and nitrogen react with and kill biologically active organic species such as bacteria, viruses, fungi, amoebas, diatoms, and other microorganisms, as well as larger animals such as fish, snails, mussels and the like, thus disinfecting the water stream. The generation of the ionized vapors takes place within a gas ionization system providing particularly efficient, high rate production of the reactive nitrogen and oxygen ionized vapors. This unit is sometimes referred to herein as the NI-OX vapor ion generator or the Ionized gas generator, although use of this acronym is not to be taken to limit the invention to embodiments of equipment or processes that may be offered under that or a similar tradename or mark.

The NI-OX trademark refers to the production of "ionized oxygen" and "ionized nitrogen" vapor gas ions. This vapor generator when incorporated with the other components of a system according to the invention provides a unique and highly efficient water treatment system. As explained further below, the components are optimized to generate a plethora of highly reactive ionized oxygen and ionized nitrogen species from oxygen and nitrogen in air, under circumstances also encouraging secondary recombination with water vapor to produce additional disinfecting hydroxide and hydrogen peroxide gas vapor ions. The system is arranged so that the majority of the oxygen ions do not have any opportunity to be converted back to lower energy, less reactive ground state configurations, characteristic of atmospheric oxygen species, but instead react with the ionized nitrogen ions that are formed simultaneously, and with the biological species to be destroyed. This interaction sequence quickly stabilizes by production of a very reactive group of electron-rich, i.e., negatively charged, vapor molecules that is very effective in coagulating and disinfecting water. This group of ionized molecules is referred to as the NITROXYL vapor ion species. The NITROXYL vapor ion group represents a unique stand-alone water treatment, suitable for highly efficient treatment and water purification and decontamination. Again, use of this term as shorthand herein should not be construed to limit the invention, e.g., to any equipment produced by the inventors or their affiliates.

According to a further aspect of the present invention, in addition to the ionized oxygen and nitrogen species generated and used in ways similar to those disclosed in the prior patents listed above, ionized chlorine gas molecules are generated in order to provide further disinfection capability. If salt water is to be treated, the chlorine ions are generated by electrolysis of the stream of salt water itself to be treated; in some cases it may be desirable to electrolyze a portion of the stream to be treated, which is then returned to the main stream. If fresh or insufficiently salty water is to be treated the chlorine ions are generated by electrolysis of brine. Particularly in shipboard applications, the chlorine ions are produced by electrolysis of the water stream being treated, so that the chlorine ions are produced in situ, thus avoiding production of gaseous chlorine. This electrolysis unit is known as the CLORIN generator, and the gas stream including ionized chlorine atoms as the CLORIN stream. Again, use of this term as shorthand herein should not be construed to limit the invention.

The integration and co-interaction of the NITROXYL vapor ions generated in the NI-OX system with ionized chlorine, oxygen, and hydrogen produced in the CLORIN system according to the invention creates an entirely new family of very accelerated and aggressive disinfectants, oxidants, and coagulants known as CLORINOXYL vapor ions. As above, use of this term as shorthand herein should not be construed to limit the invention, for example, to any equipment produced by the inventors or their affiliates.

In a preferred embodiment, the chlorine ions are produced by electrolysis of the water to be treated (with brine added if necessary) between spaced parallel metallic plates, with direct current power applied to alternating ones thereof. The plates can be formed of stable materials, such as stainless steel, of sacrificial metals, such as aluminum, or combinations thereof, and may include Rhodium plating or other rare metals that are specifically designed to interact with the chemistry in the water. Sometimes plating out some of the heavy metals and other times sacrificing itself to produce a catalytic reaction. The device thus assembled also provides electro-coalescence, in that sub-micron sized contaminants are attracted to the charged plates and agglomerate thereon. Lighter agglomerations of particles tend to float to the surface of the liquid, and can be separated and removed. Heavier particles tend to collect on the plates; when a significant quantity of particles has accumulated, their collective weight causes them to drop off the plates during periods when the charge is removed, e.g., during periodic polarity reversal, which is performed to prevent uneven erosion of the material of the plates and/or accumulation of scale thereon. The fallen particles can be collected and removed as a sludge or the like. In this way the same device serves to generate the CLORIN disinfectant gas stream and as a solids separation and removal device. Alternatively, solids removal can be performed using equipment and techniques disclosed in the prior patents listed above, or otherwise.

BRIEF DESCRIPTION OF THE DRAWINGS

The invention will be better understood if reference is made to the accompanying figures, in which:

FIG. 10, comprising FIGS. 10(a)–(e), shows several views of an injection mixer for mixing the ionized atoms and molecules with a water stream to be treated that is useful in practice of the invention.

DESCRIPTION OF THE PREFERRED EMBODIMENTS

As indicated above, the essential principle of the water treatment methods and apparatus provided according to the invention is to provide essentially complete destruction of biological contaminants, that is, microorganisms of all types, such as parasites, bacteria, fungi, viruses, and algae, as well as larger organisms, followed by their removal from the water stream, coupled with separation and removal of non-biological contaminants as may be present.

As set forth in the prior patents referred to above, the biological destruction process is accomplished principally by providing streams of ionized gas atoms and molecules; according to the present invention, these are chiefly various highly reactive ionic species of oxygen, chlorine and nitrogen. Ionized oxygen and nitrogen of various species are produced by exposing a stream of air to intense short-wavelength ultraviolet (UV) radiation, and in some cases to an electric field. A stream of vapor including high concentrations of these ions is then rapidly mixed with the water stream to be treated, so that the ions do not have time to recombine, and under circumstances that ensure thorough mixing. Ionized chlorine, along with additional ionized oxygen and hydrogen, is then produced in situ by electrolysis of brine, either a stream of salt water itself to be treated or water with additional brine added. This has the effect of lysing and killing the microorganisms and other biological agents present in the water stream, essentially by oxidizing and reducing reactions.

The killed microorganisms and other contaminants can then be removed from the water stream in one or more of several separation devices, which can be incorporated in the vessel in which the chlorine ion production and mixing with the stream of air including ionized oxygen and nitrogen takes place. As discussed further below, electro-coalescence, as taught by the prior patents listed above, can be employed to cause the contaminants to flocculate and settle, simplifying their removal; electrostatically-chargeable media may also be employed.

Figure 2:
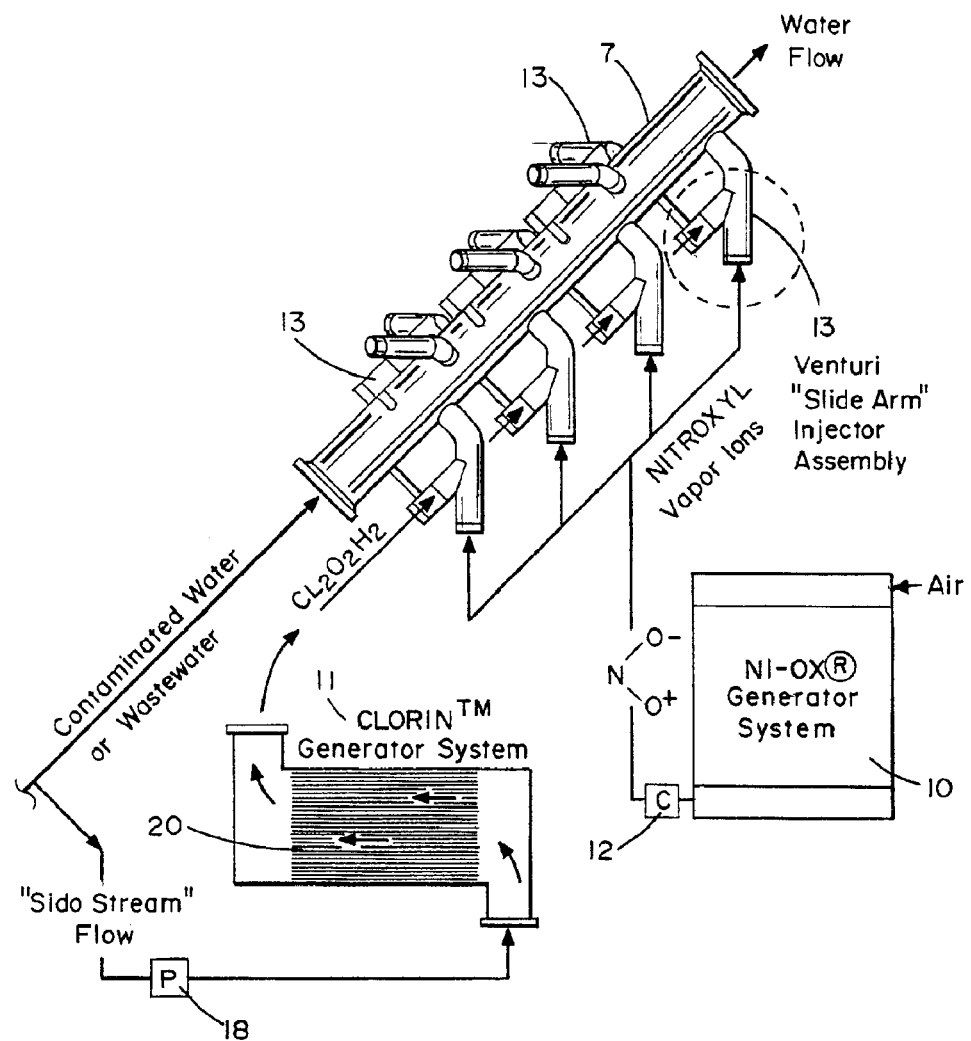
FIG. 2 shows a schematic diagram of a second embodiment of a water treatment system incorporating the invention.
Figure 8:
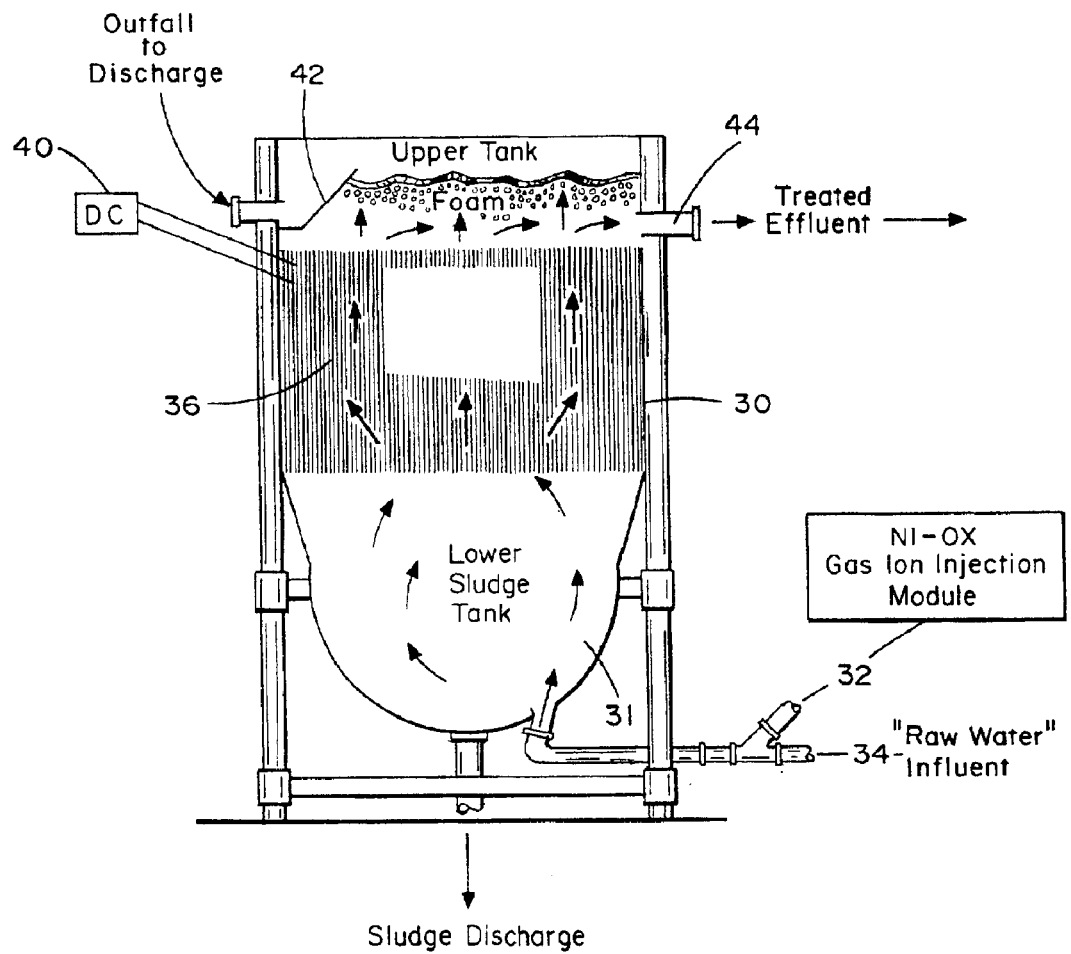
FIG. 8 is a diagrammatic view of an overall treatment unit, including an electrolysis plate cell unit used to generate ionized chlorine and additional oxygen and hydrogen ions, and to perform solids removal.
Figure 8A:
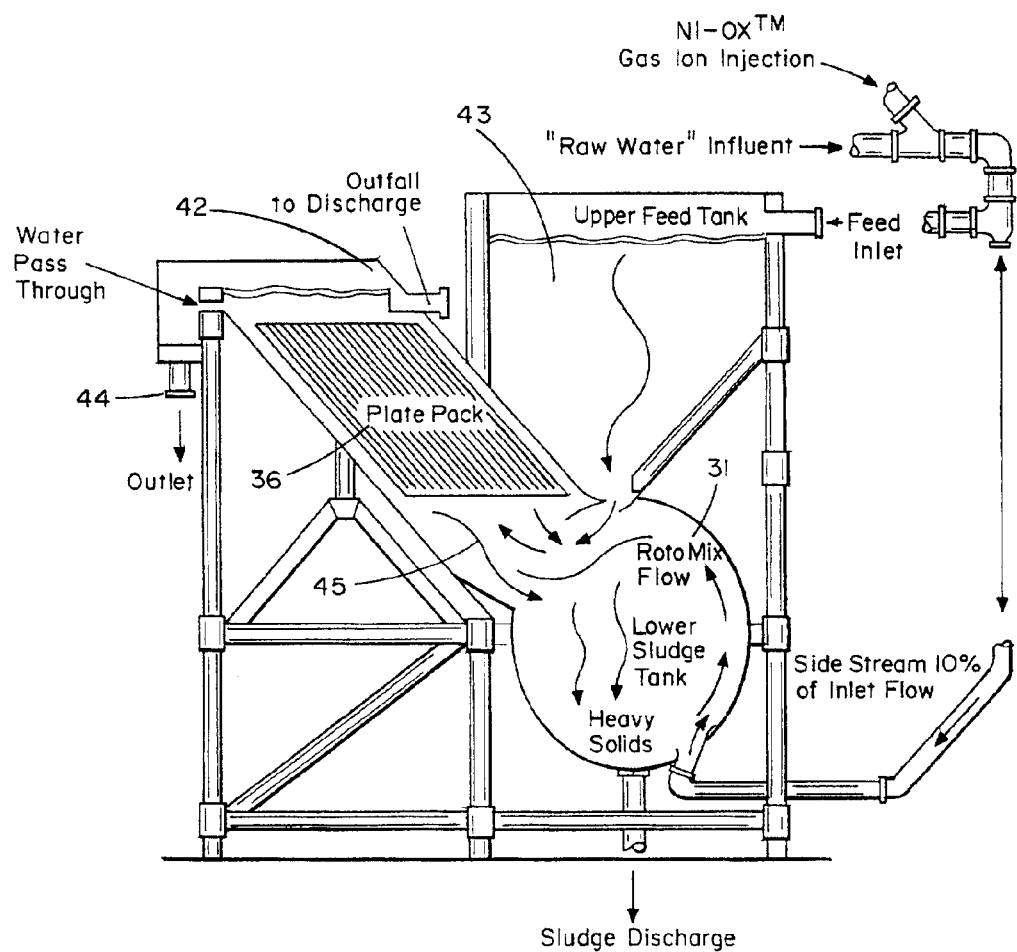
FIG. 8A is a similar diagrammatic view of a modified version of the FIG. 8 embodiment of an electrolysis plate cell used similarly to generate ionized chlorine and additional oxygen and hydrogen ions, and to perform solids removal.

The present application is directed to use of the techniques and apparatus of the invention in the marine, non-land-based environment. Particularly in shipboard applications, the preferred embodiment of the invention is one in which the ionized chlorine is produced in situ, that is, by electrolysis of seawater, as opposed to embodiments wherein the chlorine is produced in gaseous form and subsequently mixed with the water to be treated. However, to simplify the presentation of the invention hereby this distinction is not mentioned on every possible occasion herein. Briefly, however, in the shipboard environment, e.g., for treatment of ballast water on intake or prior to discharge, the in situ chlorine generation shown in FIGS. 2, 8 and 8A is preferred over the gas-phase chlorine generation shown in FIGS. 3, 4 and 5.

Figure 1:
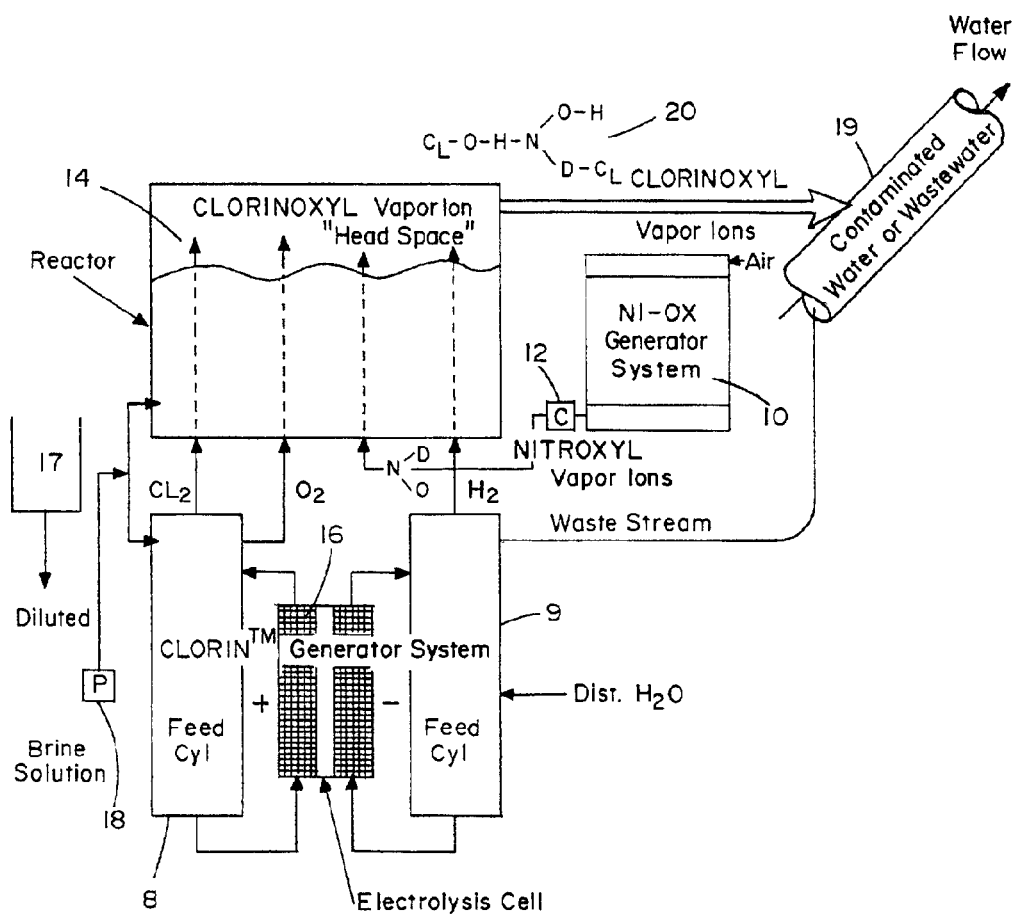
FIG. 1 shows a schematic diagram of one embodiment of a water treatment system incorporating the invention.
Figure 3:
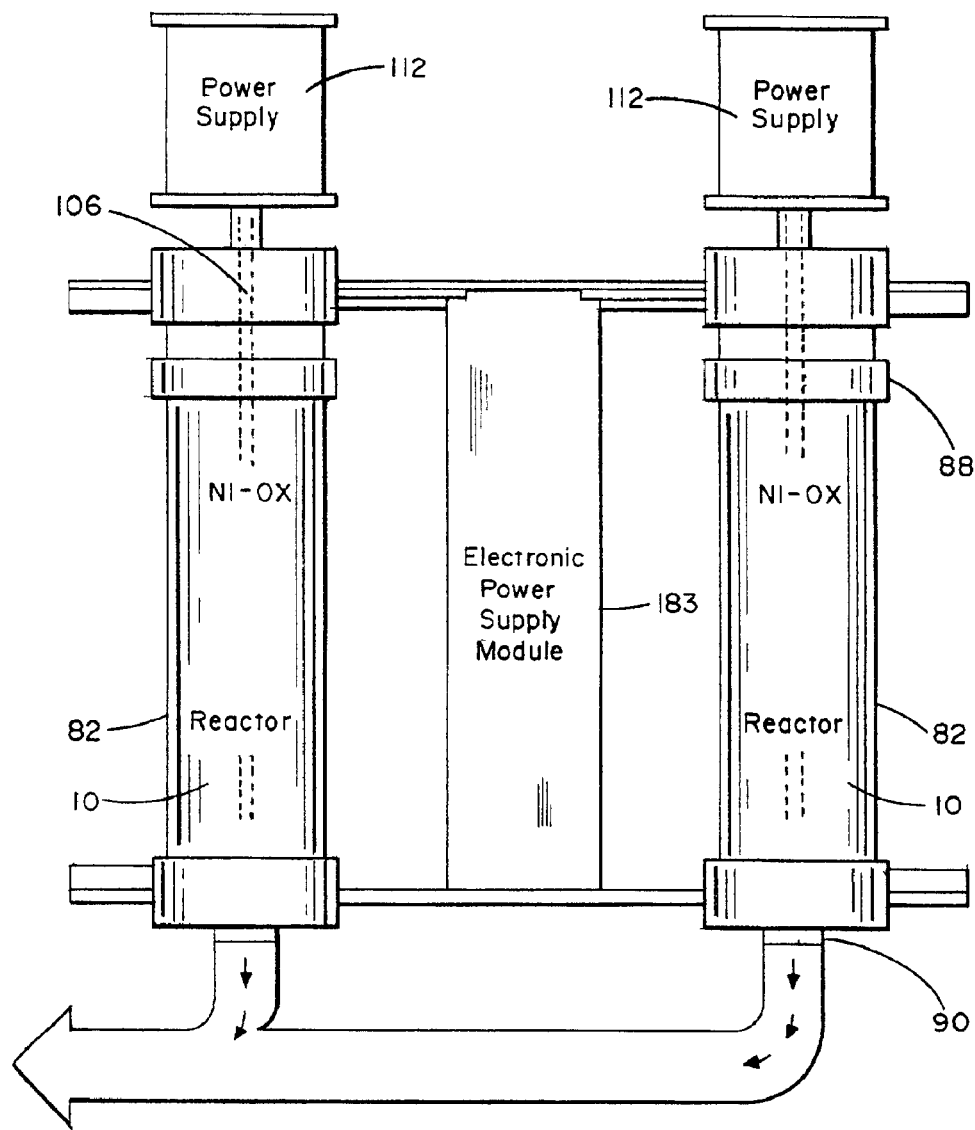
FIG. 3 is a diagrammatic view of a first embodiment of an improved unit for generating streams of various species of ionized oxygen and nitrogen vapor ions as may be employed in implementing the invention.

FIG. 1 shows a typical system arrangement. Item 10 is an ion generator unit, several embodiments of which are shown herein; one embodiment, for example, is shown in FIG. 3, and another by FIGS. 4 and 5. The ion generator unit produces a stream of various species of ions of oxygen and nitrogen in air. This stream of ions of oxygen and nitrogen in air is referred to in the drawings, and elsewhere, as the "NI-OX" stream; again, use of this acronym does not limit the invention to embodiments of equipment or processes that may be offered by the inventors and their affiliates under that or a similar tradename or mark. The listing of ionic species shown as being produced by ion generator 10 is further expanded upon in FIG. 6.

Figure 9:
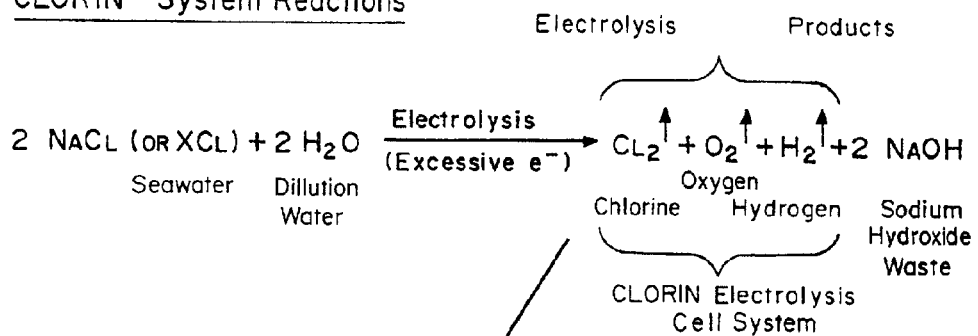
FIG. 9 illustrates typical ionic species that are formed in operation of the chlorine ion generating system of the invention.
Figure 9:
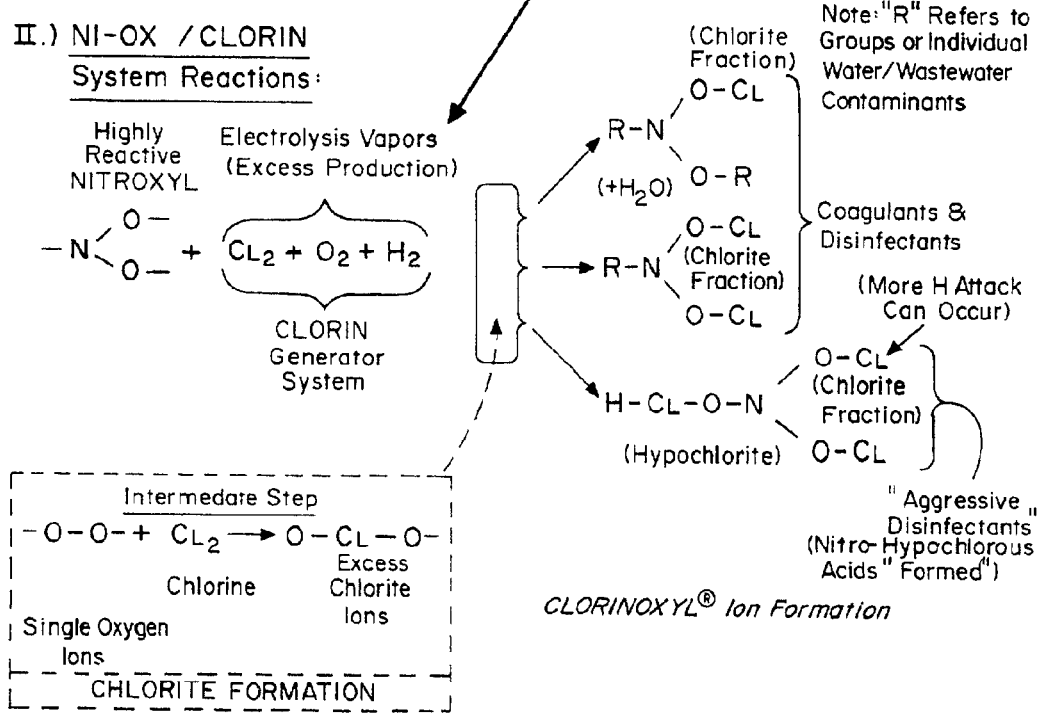

The stream of ions in air is compressed by compressor 12, for injection into a mixing tank 14, which can be readily fabricated of PVC pipe components. Tank 14 contains a quantity of brine, which is conveniently employed for mixing the gas streams. Brine solution, simply comprising food-grade salt in water, is supplied to tank 14 from a reservoir 17 by a metering pump 18. Brine is supplied to a brine electrolysis cell 16, e.g., as detailed in FIG. 7, by feed tank 8, and distilled water, for flushing the electrolysis cell at intervals, is provided by feed tank 9. DC power applied to the brine electrolysis cell 16 causes ionized atoms and molecules of chlorine, oxygen, and hydrogen to be released from the solution. This mixture of ionized gaseous atoms and molecules, which is further detailed in FIG. 9, is referred to in the drawings, and elsewhere, as the "CLORIN" stream; again, use of this acronym does not limit the invention to embodiments of equipment or processes that may be offered under that or a similar tradename or mark. In alternative embodiments shown in FIGS. 2, 8 and 8A, which, as mentioned, are preferred for shipboard and like maritime applications, the brine electrolysis may be performed in the same apparatus in which coalescence and separation of solids occurs.

Referring again to the FIG. 1 embodiment, the CLORIN gas stream is piped to the bring tank 14, where it is mixed with the NI-OX stream. The resulting gas stream, the principal active components of which are listed at 20 (and explained in detail in FIG. 9), is then mixed with water to be treated, as indicated at 19; the ionized gases are extremely effective in killing all manner of living organisms in the water stream, thus essentially sterilizing the water stream in accordance with the objects of the invention. As above, this combined stream of reactive vapor ions in air is referred to in the drawings, and elsewhere, as the "CLORINOXYL" stream; again, use of this acronym does not limit the invention to embodiments of equipment or processes that may be offered by the inventors and their affiliates under that or a similar tradename or mark.

FIG. 8 shows one preferred form of primary separation vessel 30 in which the CLORINOXYL mixture of ionized gas atoms and molecules is generated in situ and reacts with the water stream to be treated. As indicated, the NI-OX stream is injected at 32 into the water stream 34 just prior to entry into vessel 30. If desired, the water stream can be passed through a venturi, to provide a partial vacuum drawing the NI-OX stream thereinto, as discussed in various of the prior patents discussed above. Further, if the water stream to be treated does not include sufficient salt to release chlorine upon electrolysis, brine may be added. The NI-OX vapor stream is admitted to the lower portion 31 of vessel 30 together with the water stream to be treated, under circumstances (i.e., high pressure of the injected water stream) that ensure turbulent conditions in the lower portion of the vessel, so that, although contaminant solids settle out and form a sludge, good mixing of the NI-OX gas stream and water stream occurs. The mixed stream gradually percolates upwardly in vessel 30, until it occupies the interstitial spaces between a number of paired metallic electrode plates 36. These plates can be stainless steel, for corrosion resistance, or can be made of sacrificial aluminum material, for promoting further precipitation of contaminants from the water stream. In a particularly preferred embodiment, the metal of the plates may include a significant proportion of Rhodium, which appears to be effective in furthering the inventive processes. Alternate ones of the plates are connected to positive and negative terminals of a DC power supply 40, so as to establish electric fields between each successive pair of plates 36; that is, alternate ones of plates 36 serve as anode and cathode. The plates may be corrugated, with the corrugations oriented transversely to the direction of flow, to increase their surface area and create turbulence. As further detailed below, under these circumstances salt in the water is electrolyzed, releasing ionized gaseous chlorine atoms and molecules, as well as further ionized hydrogen and oxygen; these ionized gas atoms and molecules, comprising the CLORIN stream, mix with the NI-OX stream previously injected to form the CLORINOXYL stream. The CLORINOXYL stream, as mentioned, is extremely efficacious in killing all manner of biological contaminants in the water stream.

With respect to the plates, they may be of aluminum or stainless steel as the chemistry may dictate. Alternatively, Rhodium or other rare metals and rare earth metals may be used to remove heavy metals through various different chemical reaction mechanisms. Sometimes the plates may be plated or designed to plate out heavy metals. In other cases, they may be sacrificed.

The electric field existing between each pair of plates 36 causes the killed microorganisms, as well as other dissolved or suspended solids to flocculate, i.e., to agglomerate into a low-density foam floating to the top of the water in vessel 30. The level of the water in vessel 30 is controlled so that the foam and floating scum pass over a weir 42 and are disposed of, while the treated water is withdrawn from an exit port 44, as indicated. At the same time, heavier solids tend to collect on the plates, due to electrostatic attraction. These heavier solids also agglomerate. When the polarity of the DC power is reversed, which is performed at intervals of on the order of minutes or hours, to prevent uneven erosion of the plates and limit accumulation of scale thereon, the heavier solids fall off the plates and are collected as a sludge in the bottom of the vessel.

The treated effluent withdrawn at 44 from the primary separation vessel 30 can then be passed to a second separation vessel (not shown), if necessary for final polishing, i.e., solids separation and removal. Such a second separation vessel may amount to a refinement of the "ECMS" system described in detail in U.S. Pat. No. 5,597,479, listed above. In essence, water to be treated is admitted to a vessel, the lower portion of which is filled with a bed of polarizable granular media, such as crushed glass, alumina, ceramic materials, activated charcoal, coal fines, or aluminum silicates. Several electrodes extend well into the bed, so that when a DC bias is applied, the media is electrically polarized. This has the effect of causing solids to be attracted to the media, providing sub-micron filtration. In order to ensure that the water to be treated is intimately mixed with the media, water is withdrawn from the vessel by way of an underdrain assembly comprising a number of perforated tubes connected to an outlet manifold. Similarly, the inlet can be implemented by admitting the water to the vessel by way of a number of nozzles connected to an inlet manifold; further NI-OX, CLORIN, or CLORINOXYL gas streams can be added if further disinfection is desirable. The media can be backflushed from time to time by reversing the direction of flow.

FIG. 8A shows a modified embodiment of the system of FIG. 8. In the FIG. 8A version, the major portion of the influent water to be treated is admitted, after injection of the NI-OX gas stream, to an upper feed tank 43. This influent flows downwardly into a lower sludge tank 31, where heavier solids can settle out. The remaining portion (on the order of 10% of the total) of the influent is injected into the lower tank to ensure good mixing. The liquid to be treated flows upwardly, between inclined spaced metal plates 36 bearing opposite charges; the inclination increases the residence time of the water between the plates, increasing the flocculation, without increasing the space required. As above, the electric field created therein encourages flocculation of contaminants such as killed microorganisms, which then form a foam removed by weir 42, as above, and separating treated water for removal at 44; at the same time, heavier solids are agglomerated on plates 36, dropping off during polarity reversals as indicated at 45 to form a sludge, while the chlorine ions are formed in situ between plates 36.

Figure 4:
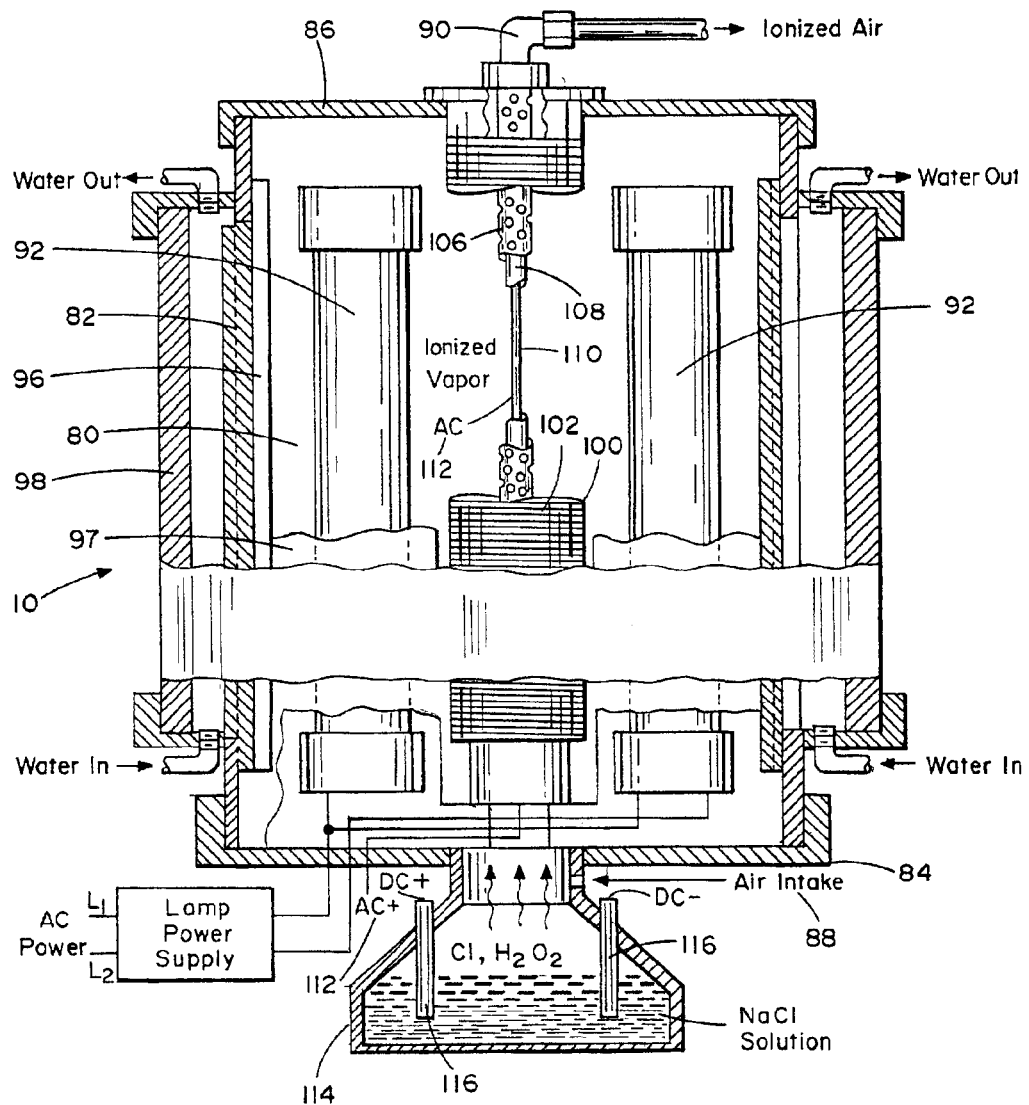
FIG. 4 is a part sectional view of a second embodiment of an improved unit for generating streams of various species of ionized oxygen and nitrogen vapor ions, again as may be employed in implementing the invention.
Figure 5:
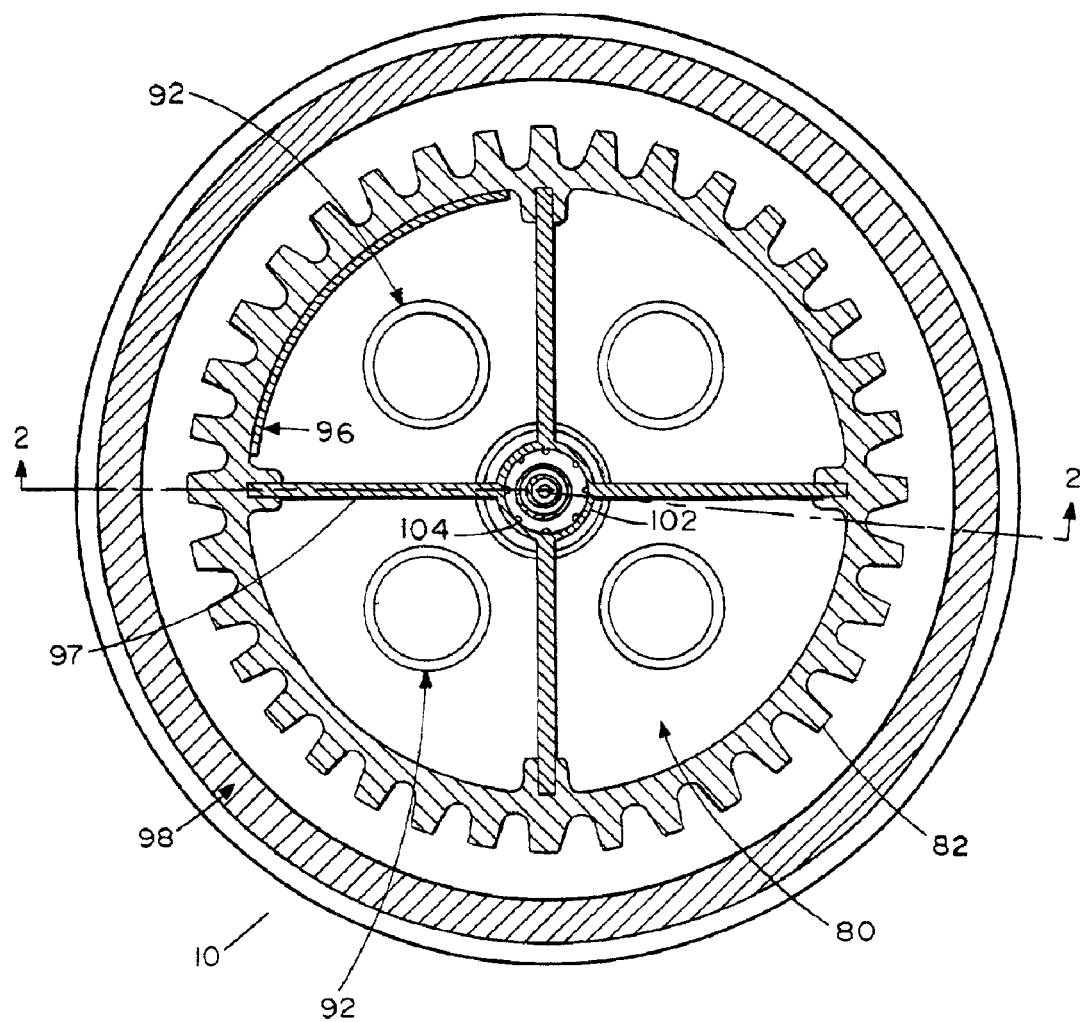
FIG. 5 is a cross sectional view of the FIG. 4 vapor ion generator unit.

As discussed briefly above, the function of the ion generator 10 is to provide a stream of various highly reactive species of oxygen and nitrogen ions in air. A preferred form of ion generator 10, which also incorporates a brine electrolysis unit for producing chlorine ions, is shown in FIGS. 4 and 5; as mentioned above, this can be supplanted or supplemented by a separate brine electrolysis unit 16, detailed in FIG. 7 and discussed below. As noted, however, use of these devices as source of chlorine ions is not preferred in shipboard environments, as the gaseous chlorine that is produced can be dangerous and is also highly corrosive. The basic principle of operation of ion generator 10 is as discussed in the prior patents listed above, that is, exposure of a stream of air to short-wavelength ultraviolet radiation (UV) causes ionization to take place, but further improvements are provided in the embodiment shown in FIGS. 4 and 5.

Thus, the ion generator 10 includes an inner volume 80 defined by a generally tubular reactor 82, capped at either end by lower and upper caps 84 and 86. An air flow pathway is defined by an entrance port 88 in communication with the lower end of volume 80, and an outlet port 90 in communication with the upper end of volume 80. Air flow may be motivated by compressor 12 (FIG. 1). Supported within volume 80 are one or more (four in the embodiment shown) high-intensity UV lamps 92, powered by power supply 94 so as to emit short wavelength, high energy UV. A substantial fraction of the oxygen and nitrogen drawn into entry port 88 is ionized by exposure to the UV as the air stream flows past lamps 92 on its way to exit port 90. To increase the efficiency of exposure, the inner surface of tubular reactor 82 may be polished, so as to reflect the UV effectively, or, if polishing is not feasible, it may be lined with stainless-steel sheet metal, as indicated at 96 (FIG. 5). Polished stainless steel may also be used for reflective dividers 97. More specifically, in the preferred embodiment shown, tubular reactor 82 is an aluminum extrusion having a finned outer surface for efficient heat exchange with cooling water confined against the outer surface of member 82 by a water jacket 98.

To further improve the efficiency of ionization, and thus to accelerate the reaction of the ions with the microorganisms to be destroyed, the air flow path is constrained so that the air flows into a coaxial assembly of a perforated outer tube 106, preferably formed of stainless steel, a tubular ceramic insulator 108, and an inner solid conductor 110. The air stream including the ionized components is withdrawn from the end of the interior of tube 106, and an AC power supply (indicated schematically by positive and negative connections 112) is connected across perforated tube 106 and solid wire 110. This power supply typically provides up to 10,000 volts at up to 20,000 Hz; very little current flows, so that the power requirements are reasonable, but a high-intensity field is provided. As the vapor stream including ions of oxygen and nitrogen (and chlorine, as below) is drawn through the annular space between tube 106 and insulator 108, and experiences the electric field provided thereacross by power supply 112, some fraction of the ions experience an increase in their ionic state, i.e., they become more highly ionized and hence more reactive. This has the effect of further increasing their efficacy in destroying the microorganisms when the gas stream thus produced is later mixed with the water to be treated. If desired, e.g., to improve the uniformity of gas dispersement, a tubular baffle member 100 can be provided, outside of the assembly of tube 106, insulator 108, and solid conductor 110. In the embodiment shown, baffle 100 is formed by winding a wire 102 spirally over longitudinal forming wires 104. Successive coils of wire 102 are spaced from one another, so that air inlet passages forming a generally spiral pattern are provided.

The brine electrolysis unit shown simply comprises a tank 114 containing a brine solution and fitted with two electrodes 116 connected to a DC power supply. As indicated, electrolysis of the brine causes reactive species of ionized chlorine, oxygen, and hydrogen to be released, which flow upwardly and join the air stream entering via port 88, and which are then further ionized by the high-intensity field between perforated tube 106 and rod 110.

As will be appreciated, the gas generator of FIGS. 4 and 5 is water-cooled, in that water flowing within water jacket 98 will cool the outer finned member 82. If this degree of heat removal is not needed, that is, in smaller installations, an air-cooled gas generator shown in FIG. 3 may be used. In this embodiment, four parallel UV lamps connected to power supply 83 may be disposed in each of two sealed tubes 82. The lamps are preferably disposed in close proximity to one another; this appears to have the effect of creating a magnetic interaction between the lamps which is beneficial in efficiently ionizing the gas atoms, although the invention is not to be bound by this observation. Each unit may be fitted with the reflective inner baffles 97 and provided with a reflective inner surface 96, as in the FIGS. 4 and 5 embodiment, to ensure efficient absorption of the UV, and may also comprise the central assembly of perforated tube 106, ceramic insulator 108, and central rod 110, with AC power supply 112, also as in FIGS. 4 and 5. Air to be ionized passes through the tubes 82 and the NI-OX stream thus formed is withdrawn as indicated at 90 for mixing with the water stream to be treated.

Figure 7:
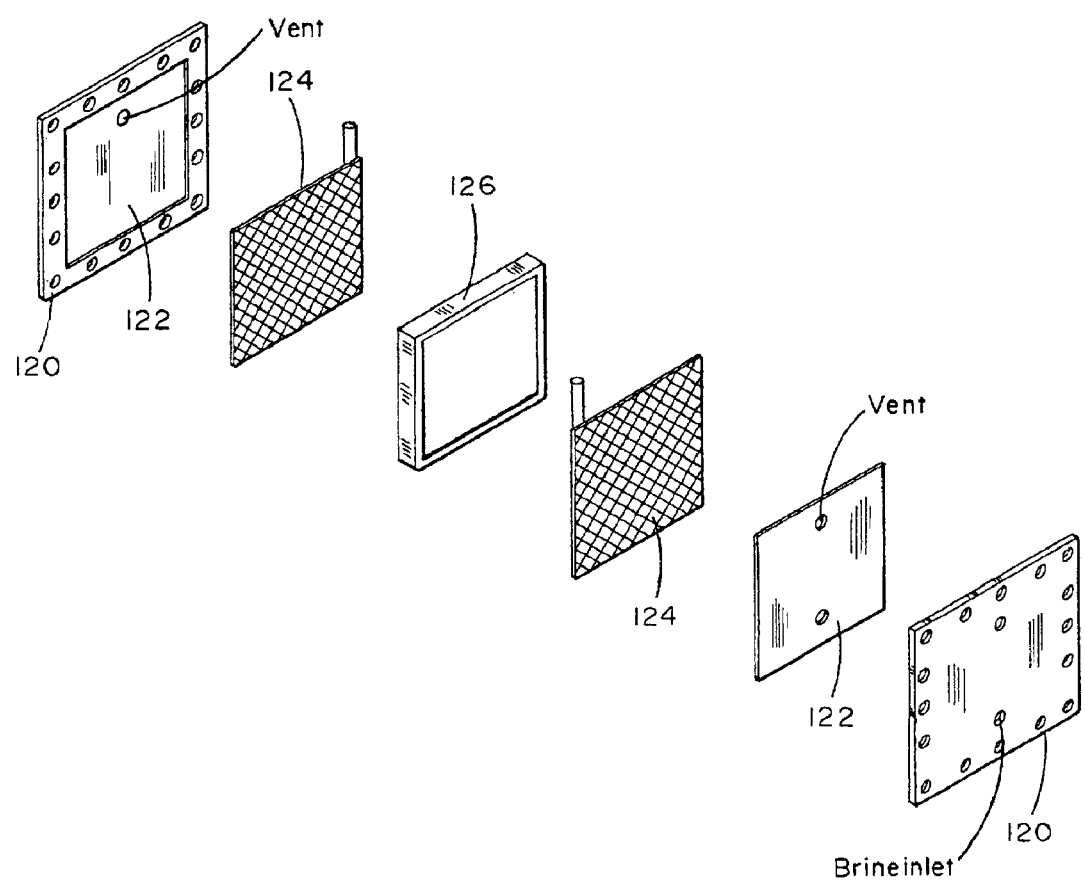
FIG. 7 is an exploded diagrammatic view of one embodiment of an electrolysis membrane cell used to generate ionized chlorine, and additional oxygen and hydrogen vaporions.

As mentioned, FIG. 7 shows an exploded view of a brine electrolysis unit, which can be used in lieu of or in addition to the brine electrolysis unit provided as part of the ion generator of FIGS. 4 and 5. Again, however, this unit, which produces gaseous chlorine ions, is disfavored in certain environments, e.g., shipboard. The brine generator of FIG. 7 comprises a number of planar members assembled sandwich-fashion, as illustrated. The outer members 120 are stainless steel plate, e.g., approximately 12 by 18 inches in overall dimension. Disposed inwardly of these are two Delrin plastic sheets 122, providing insulation, and inward of these are two foraminous electrodes 124, formed, e.g., of stainless steel wire mesh, with members in good electrical contact therewith extending out of the "sandwich" to enable electrical connection. The innermost member 126 is a semi-permeable membrane formed, e.g., of a porous polyacrylite material, available from various manufacturers. The sandwich is assembled using a series of bolts around its periphery, and a thick layer of epoxy is provided around the periphery to provide a good seal. Piping connections are made as indicated to allow for inflow of the brine solution, essentially 5–50% of ordinary food-grade salt in water, and for withdrawal of the ionized oxygen, chlorine, and hydrogen that are released due to electrolysis when a DC current is applied across the two screens.

As above, the ionized gas streams produced according to the invention are mixed with the water stream to be treated, and oxidize and kill all manner of biological contaminants. The killed and/or disinfected microorganisms and other contaminants can then be removed from the contaminated water stream in one or more of several separation devices, which can often be incorporated into the mixing vessel in which the vapor ion injection and contact mixing take place. Electro-coalescence can be employed as above to cause the contaminants to flocculate, precipitate, and settle, simplifying their removal. The same DC electrostatically-chargeable plates may be employed to assist in the electrolysis of salt and water, forming the chlorine and oxygen vapor ions, and they may also provide the additional surfaces for electro-precipitation removal of contaminants, all as described above.

As mentioned above, FIG. 1 shows one implementation of the invention, in a design for a typical overall process system arrangement. Item 10 is an ionized oxygen/nitrogen vapor ion generator unit, which can be that shown in more detail by FIG. 3, or that of FIGS. 4 and 5. Either produces a stream of various species of reactive vapor ions of oxygen and nitrogen from atmospheric air. It is believed that in practice of the invention, specifically, in generation of the NI-OX stream as above, a stream of negatively charged (ionized) oxygen known as singlet oxygen is produced. This species of ionized oxygen is referred to in the academic and published literature as the SUPEROXIDE ion.

Figure 6A:
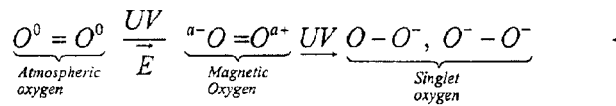
FIG. 6, comprising FIGS. 6(a)–(f), includes schematic equations illustrating formation of various ionic species that occur in operation of the vapor ion generator system of the invention.
Figure 6B:
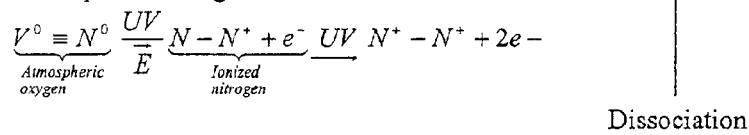
Figure 6C:
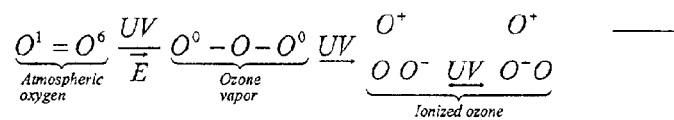
Figure 6D:
Figure 6E:
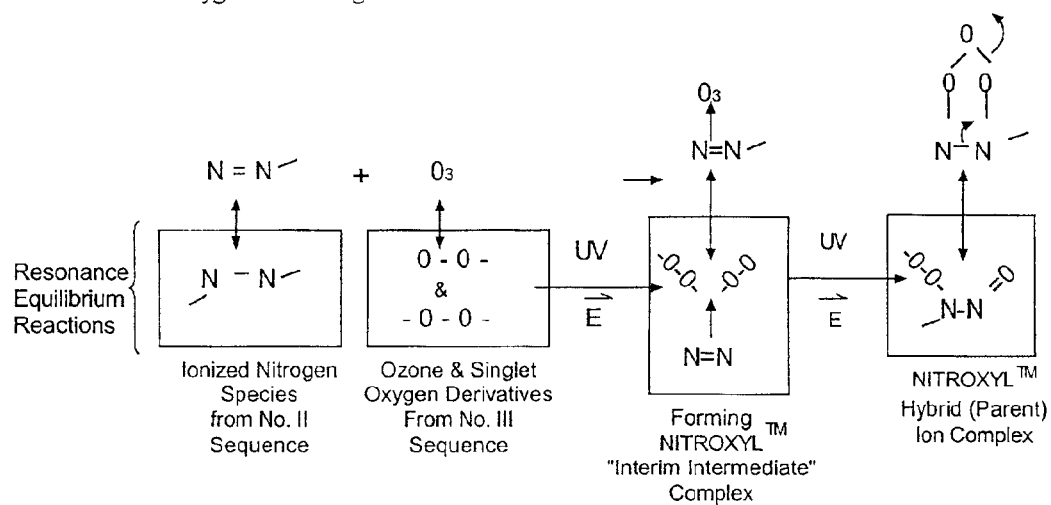
Figure 6F:
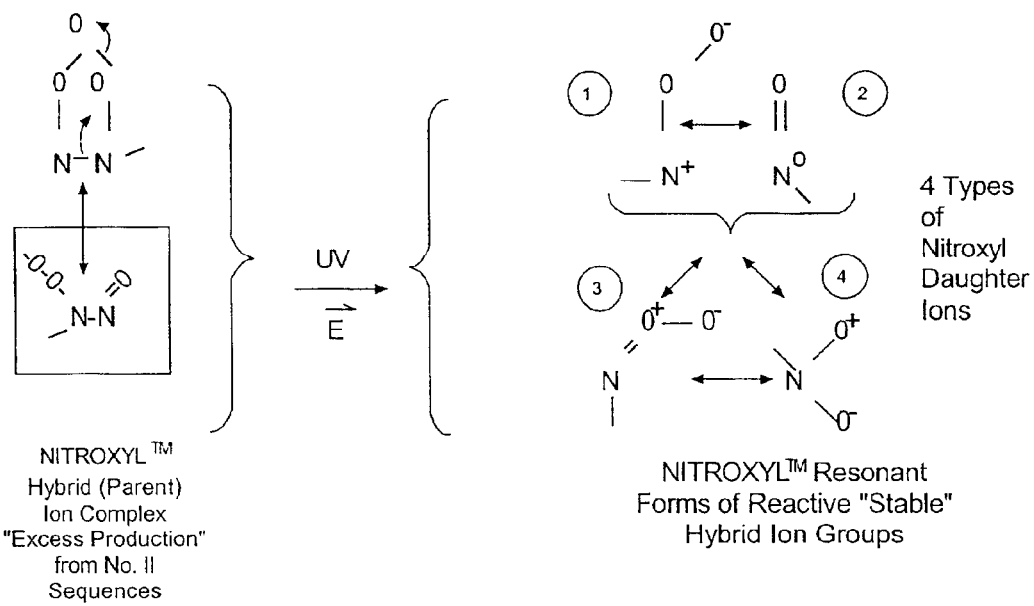

More specifically, FIG. 6, comprising FIGS. 6(a)–(f), illustrate what is believed to be representative of some of the major reaction sequences whereby various species including ionized oxygen and ionized nitrogen are formed in practice of the invention, although the invention is not to be limited thereby. FIG. 6(a) shows the reaction of atmospheric oxygen, under the influence of short-wavelength ultraviolet energy ("UV") and an electric field (denominated by a capital E with vector arrow above), to form a polarized or magnetic oxygen molecule, and thence dissociated, ionized singlet oxygen atoms; the latter are particularly reactive. FIG. 6(b) shows how atmospheric nitrogen can similarly be ionized by UV and the electric field, with the release of free electrons as well. FIG. 6(c) shows the formation of ozone, which is itself extremely reactive, and also dissociates to form singlet oxygen atoms. FIG. 6(d) indicates that the singlet oxygen may react with water vapor to form hydrogen peroxide and hydroxide radicals. As illustrated by FIGS. 6(e) and (f), the ionized oxygen and nitrogen also react to form various combinations, referred to herein as NITROXYL ion species; again, use of the NITROXYL acronym is not intended to limit the invention. As above, the stream of oxygen and nitrogen ions generated from atmospheric air is referred to in the drawings, and elsewhere, as the "NI-OX" stream, and the equipment producing it as the NI-OX equipment; again, use of this acronym does not limit the invention to embodiments of equipment or processes that may be offered under that or a similar tradename or mark. The ionic species formed as outlined in FIG. 6 can then be mixed or chemically combined with chlorine ions released by electrolysis of brine in the equipment shown in FIG. 1, 4, 7, or 8, as discussed previously.

Referring again to FIG. 1, the NI-OX stream of ionized oxygen and nitrogen is compressed by compressor 12, for injection into a brine mixing tank 14. Brine solution can be supplied to tank 14 from a reservoir 17 by metering pump 18. A portion of the mixture of brine (food grade sodium chloride salt solution) is drawn off and slowly metered into a brine electrolysis cell 16, as shown in FIG. 1 and detailed in FIG. 7. Low voltage DC power in the range of 8 to 12 volts and 4 to 8 amps is applied to the brine electrolysis cell 16 and causes ionized chlorine, oxygen, and hydrogen vapor ions to be released from the solution. This released vapor ion gas mixture is referred to in the drawings, FIG. 9, and elsewhere, as the "CLORIN" vapor ion stream; again, use of this term as shorthand herein is not to limit the invention. As noted, in an alternative electrolysis cell configuration embodiment shown in FIG. 4, the generation of ionized chlorine, oxygen, and hydrogen vapor ions by electrolysis of brine may be performed in the same apparatus as that in which the NI-OX stream of ionized nitrogen and oxygen vapor ions from air is being produced. In FIG. 1, the CLORIN stream is piped to the closed brine tank 14 and further interacts and combines with the NI-OX generated vapor ion stream.

FIG. 9 lists at II the principal active ion groups which are believed to be formed in the combined gas stream; again, however, the invention is not to be so limited. This highly reactive ion stream, referred to as the CLORINOXYL ion group, is then injected and mixed with the contaminated water to be treated. The ionized treatment gases that are generated are extremely effective in killing all manner of microorganisms in the water stream, thus essentially sterilizing the contaminated water or wastewater stream in accordance with the objects of the invention. FIG. 2 shows a further system arrangement, useful with extremely high flow rates, e.g., millions of gallons per day, and FIG. 10, comprising FIGS. 10(a)–(e), details the preferred arrangement of the mixing chamber thereof. These systems arrangements are useful in treating the large volumes of water encountered in ballast water purification. As indicated, a stream of water to be treated flows down the lumen of a large pipe 7; to give an idea of the scale at which the invention may be applied, pipe section 7 may be from 4 to 24 inches in diameter and from 4 to 12 or more feet long. The pipe 7 is fitted with a number of injector assemblies 13, detailed in the cross-sectional view of FIG. 10(d). The pipe 7 and injector assemblies 13 may be made of steel pipe and welded together. Each injector 13 is connected to NI-OX and CLORIN generators, 10 and 11 respectively, as shown in FIGS. 2 and 10(d). As illustrated in FIG. 2, the CLORIN generator 11 comprises a number of spaced parallel metal plates across which DC is applied; a portion of the incoming stream passes through this vessel, so that the chlorine ions are formed in situ. The injector assemblies 13 are disposed spirally around the pipe 7, as illustrated in FIGS. 10(a), (b) and (c) so as to impose a spiral flow path to the water passing therethrough and ensuring good mixing.

As shown by FIG. 10(d), the injector assemblies each comprise separate connections, illustrated at 21 and 22, for the NI-OX and CLORIN streams, so that the CHLORINOXYL stream is formed in situ; this gives it maximum efficiency, since the reactive molecules have very little time to react with one another, dissociate or the like, but instead are immediately mixed with the stream of water to be treated, and so achieve maximum disinfection. Further, introduction of the gas streams into the fast-flowing water stream provides a venturi suction effect, further ensuring good mixing. More specifically, a tube 23 may be arranged as shown, with an angled mouth open toward the incoming flow, to withdraw a portion of the incoming flow; this portion is directed into the CLORIN injection tube 22, and impacts against a porous plastic diffuser 25. The NI-OX stream flows through diffuser 25, ensuring that it is finely divided, entering the water stream as small bubbles, ensuring good mixing. Similarly, arranging the flow of the CLORIN stream so as to impact the diffuser 25 ensures good swirling of the incoming streams so that they are thoroughly mixed. Furthermore, withdrawal of the portion of the main flow by tube 23 reduces the pressure in the main tube 7, creating a venturi pulling the gas mixture in by way of injection pipe 24. As shown by FIG. 10(e), the tip of the gas injection pipe 24 is notched, as indicated at 26; this increases the suction created by the venturi, and further ensures good mixing.

While several preferred embodiments of the invention and several alternatives have been discussed in detail, those of skill in the art will recognize that further improvements thereon are possible without departure from the spirit and scope of the claims.

What is claimed is:

1. A system for disinfecting salt water, comprising:
    means for exposing a stream of air to short-wavelength ultraviolet radiation, whereby ions of oxygen and nitrogen are formed in said stream of air;
    means for mixing the ions of oxygen and nitrogen with the salt water to form a first mixture of salt water and ions of oxygen and nitrogen; and
    means for electrolyzing the first mixture of salt water and ions of oxygen and nitrogen, whereby chlorine ions are produced in situ in the first mixture of salt water; and ions of oxygen and nitrogen.

2. The system of claim 1, wherein said means for electrolyzing the first mixture of salt water and ions of oxygen and nitrogen comprises a vessel containing a plurality of spaced parallel plates of conductive material, wherein alternating ones of said plates are connected to a source of direct current, to produce an electric field between alternating pairs of plates, whereby salt in said vessel is electrolyzed, releasing ionized chlorine.

3. The system of claim 1, wherein means for exposing a stream of air to short-wavelength ultraviolet radiation comprises an elongated tubular member, having an air intake at one end and an outlet for a stream of air containing ionized atoms at the other end, a plurality of lamps for emitting short-wavelength ultraviolet radiation extending within said tubular member, and a power supply for energizing said lamps.

4. The system of claim 3, wherein said tubular is lined with UV reflective material, whereby said UV is repeatedly reflected.

5. The system of claim 4, further comprising baffles of UV-reflective material positioned between said lamps.

6. The system of claim 3, further comprising an electric field generator formed from a rod member is disposed coaxially within said hollow cylindrical member for supporting an AC potential being applied across said rod member.

7. The system of claim 3, wherein said tubular member comprises an aluminum tube fitted with first and second ends caps defining a closed cylindrical member.

8. The system of claim 7, further comprising a water jacket member fitted around said aluminum tube, and arranged to be sealed with respect to said first and second end caps, whereby cooling water can flow around said aluminum tube and further comprising a permanent magnet in the tube.

9. The system of claim 2, wherein the material forming said spaced parallel plates is selected from the group consisting of aluminum, stainless steel, Rhodium, other rare metals, and rare earth metals.

10. The system of claim 1, wherein the means for mixing the ions of oxygen and nitrogen with the salt water to form a first mixture of salt water and ions of oxygen and nitrogen comprises a section of pipe through which said stream of water is passed, and a plurality of injector assemblies connected to said section of pipe, each injector assembly being connected to said means for exposing a stream of air to short-wavelength ultraviolet radiation, whereby ions of oxygen and nitrogen are formed in said stream of air injected into the salt water through the injector assembly.

11. The system of claim 1, wherein a inner surface forming the elongated tubular member is polished to reflect the ultraviolet radiation.

12. The system of claim 1, wherein the elongated tubular member includes an inner stainless steel liner.

13. The system of claim 1, wherein the chamber further comprises a plurality of fins extending from an outer surface of the chamber.

14. The system of claim 1, further comprising a baffle formed from at least one wire and concentric with the perforated conduit.

15. The system of claim 1, wherein the means for electrolyzing at least a portion of the first mixture of salt water and ions and nitrogen is comprised of a tank having at least two electrodes.

16. A method for disinfecting a stream of salt water, comprising:
    exposing a stream of air to short-wavelength ultraviolet radiation, whereby ions of oxygen and nitrogen are formed in said stream of air;
    mixing the ions of oxygen and nitrogen with the stream of salt water to form a first mixture of salt water and ions of oxygen and nitrogen; and
    electrolyzing salt in at least a portion of the first mixture of salt water and ions of oxygen and nitrogen, whereby a second mixture of salt water, oxygen ions, nitrogen ions, and chlorine is produced and
    whereby said microorganisms and biological contaminants are destroyed.

17. The method of claim 16, wherein electrolyzing the first mixture of salt water and ions of oxygen and nitrogen comprises passing the first mixture through a vessel containing a plurality of spaced parallel plates of conductive material connected to a source of direct current, such that an electric field exists between alternating pairs of plates, whereby salt in said vessel is electrolyzed, releasing ionized chlorine.

18. The method of claim 17, wherein electrolyzing the first mixture of salt water and ions of oxygen and nitrogen comprises passing the first mixture through a vessel containing a plurality of spaced parallel plates of conductive material, wherein the conductive material of said plates is selected from the group consisting of aluminum, stainless steel, Rhodium, other rare metals, and rare earth metals.

19. The method of claim 16, wherein exposing a stream of air to short-wavelength ultraviolet radiation comprises passing said stream of air into a chamber containing a plurality of lamps for emitting short-wavelength ultraviolet radiation through an air intake at one end, passing the air in close proximity to the lamps, and exhausting the air from the chamber through an outlet.

20. The method of claim 19, wherein exposing a stream of air to short-wavelength ultraviolet radiation comprises passing the stream of air through the chamber lined with UV-reflective material, adapted to repeatedly reflect the ultraviolet radiation until absorbed by gas atoms in said stream of air.

21. The method of claim 20, wherein exposing a stream of air to short-wavelength ultraviolet radiation comprises passing the stream of air through the chamber having baffles formed from UV-reflective material and position between said lamps.

22. The method of claim 19, wherein exposing a stream of air to short-wavelength ultraviolet radiation comprises passing the stream of air through the chamber having a rod member positioned coaxially within the chamber and configured to generate an AC potential across said rod member.

23. The method of claim 19, wherein exposing a stream of air to short-wavelength ultraviolet radiation comprises passing the stream of air through the chamber comprising an aluminum tube fitted with first and second end caps defining a closed cylindrical volume, wherein a water jacket member is fitted around said aluminum tube and sealed with respect to said first and second end caps, and allowing cooling water to flow around said aluminum tube.

24. The method of claim 16, wherein mixing the ions of oxygen and nitrogen with the stream of salt water to form a first mixture of salt water and ions of oxygen and nitrogen comprises passing the salt water stream through a section of pipe including a plurality of injector assemblies connected to said section of pipe, and injecting ions of oxygen and nitrogen through the injector assemblies and into the salt water in the pipe.

25. Apparatus for the disinfection of water encountered in marine applications and contaminated by the presence of microorganisms and biological contaminants, and for removal of destroyed organisms and other solids therefrom, comprising:
    means for exposing a stream of air to short-wavelength ultraviolet radiation, whereby ions of oxygen and nitrogen are formed in said stream of air;
    a vessel having a lower settling zone, and an upper electrolysis zone;
    said vessel having an inlet communicating with said lower settling zone, for admission of said stream of air containing ions of oxygen and nitrogen, and admission of a stream of water to be disinfected, said stream containing at least a minimum content of salt, forming a brine,
    a plurality of spaced inclined parallel plates of conductive material disposed in said upper electrolysis zone of said vessel;
    a source of direct current connected to alternating ones of said plate, such that an electric field exists between alternating pairs of plates, whereby brine in said vessel is electrolyzed, releasing ionized chlorine, whereby said ionized chlorine and said ions of oxygen and nitrogen destroy microorganisms and biological contaminants in said water, and whereby said destroyed microorganisms and biological contaminants agglomerate on said plates, with other solids in said water stream;
    wherein said source of direct current is adapted to reverse polarity on said plates, and
    whereby light portions of said destroyed microorganisms and biological contaminants and other solids float and form a foam on a water surface in said vessel, and heavier portions of said destroyed microorganisms and biological contaminants and other solids settle in said settling zone of said vessel.

26. The vessel of claim 25, further comprising a weir in the upper portion of said vessel for separating said foam from disinfected water.

27. The vessel of claim 25, wherein the material forming said spaced parallel plates is selected from the group consisting of aluminum, stainless steel, Rhodium, other rare metals, and rare earth metals.

28. A method of treating water encountered in marine applications comprising:
  injecting NI-OX gases into the water being treated via a venturi to form a first mixture of NI-OX and the water to be treated; and
  generating chlorine in situ in the first mixture of NI-OX and the water to be treated.

29. The method of claim 28, wherein the water is split into two waste streams, one enters a static mixing pipe, and the other is treated with chlorine and NI-OX and returned to the static mixing pipe via an air pump or a venturi system.

30. A system for disinfecting salt water, comprising:
  means for electrolyzing an entire salt water stream to be disinfected, whereby chlorine ions are produced in situ in the entire salt water stream to be disinfected;
  means for exposing a stream of air to short-wavelength ultraviolet radiation, whereby ions of oxygen and nitrogen are formed in said stream of air; and
  means for mixing the ions of oxygen and nitrogen with the entire salt water stream to be disinfected.

31. The system of claim 30, wherein said means for electrolyzing the entire salt water stream to be disinfected comprises a vessel containing a plurality of spaced parallel plates of conductive material, wherein alternating ones of said plates are connected to a source of direct current, to produce an electric field between alternating pairs of plates, whereby salt in said vessel is electrolyzed, releasing ionized chlorine.

32. The system of claim 30, wherein the means for exposing a stream of air to short-wavelength ultraviolet radiation comprises an elongated tubular member, having an air intake at one end and an outlet for a stream of air containing ionized atoms at the other end, a plurality of lamps for emitting short-wavelength ultraviolet radiation extending within said tubular member, and a power supply for energizing said lamps.

33. The system of claim 32, further comprising an electric field generator formed from a rod member disposed coaxially within said hollow cylindrical member for supporting an AC potential being applied across said rod member.

34. The system of claim 30, wherein the means for mixing the ions of oxygen and nitrogen with the salt water stream to be disinfected comprises a section of pipe through which the salt water stream is passed, and a plurality of injector assemblies connected to said section of pipe, each injector assembly being connected to said means for exposing a stream of air to short-wavelength ultraviolet radiation, whereby ions of oxygen and nitrogen are formed in said stream of air and injected into the salt water through the injector assembly.

* * * * *